May 10, 1932.  H. B. TURNER  1,858,124
ICE CUBE TRAY
Filed Feb. 4, 1931
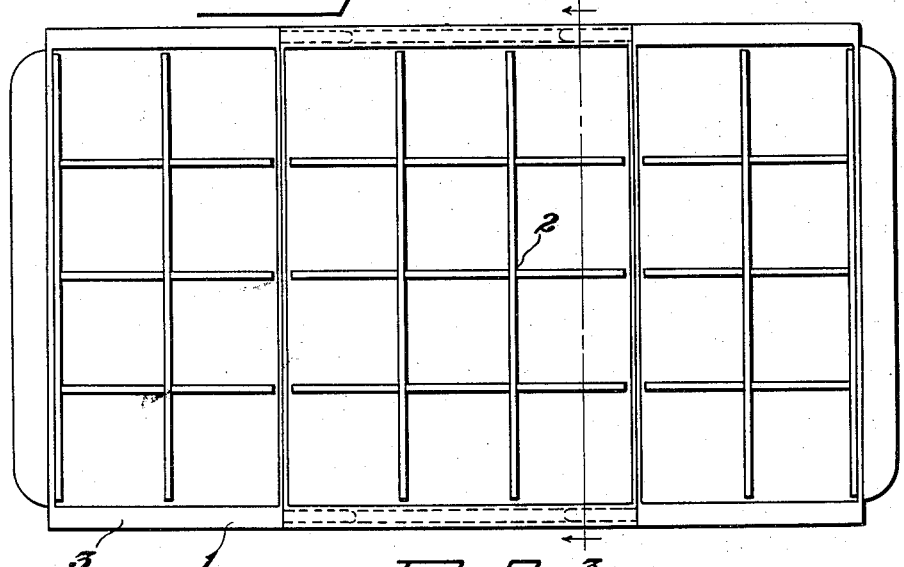
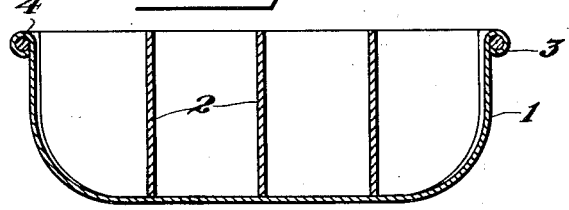
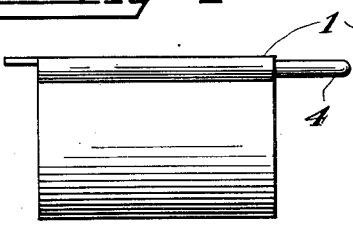
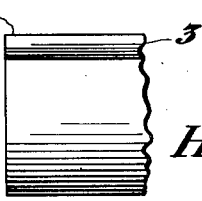
Henry B. Turner
INVENTOR
BY Victor J. Evans
ATTORNEYS Patented May 10, 1932

1,858,124

UNITED STATES PATENT OFFICE

HENRY B. TURNER, OF LAWTON, OKLAHOMA

ICE CUBE TRAY

Application filed February 4, 1931. Serial No. 513,423.

In the ordinary construction, the trays for the grids in which the ice cubes, ice cream, frozen desserts, etc., are frozen, in self-cooling or ice-making refrigerators must be entirely removed from the freezing compartments when wanted to remove ice cubes, ice cream, frozen desserts, etc. therefrom. As a general rule only a part of the contents of the trays are required at one time.

In the ordinary construction the tray must be emptied of all of the contents whether needed or not. Also with the ordinary tray only one kind, color or flavor of ice cream or frozen dessert can be frozen in a tray.

The object of this, my present invention, is to construct a tray for this purpose that shall be made of sections, connected in such a manner as to provide a unitary structure, but also constructed and arranged as to permit any of the sections and the grid therein being separately removed from the remaining sections so that only one or more sections can be emptied as desired, leaving the remaining sections with contents intact to be emptied and used as needed.

Another advantage of this tray over the ordinary type, is each section of tray can be used for a different flavor or color of frozen cubes, creams, desserts, etc. In the ordinary type of trays only one kind of color can be used.

In the drawings:

Figure 1 is a top plan view of the improvement.

Figure 2 is a side elevation thereof with parts in section.

Figure 3 is a transverse sectional view approximately on the line 3—3 of Figure 1.

Figures 4 and 5 are side elevations illustrating two of the tray sections separated.

The tray 1 is of the usual construction but as disclosed by the drawings the same comprises a plurality of sections. Any desired number of sections may be employed, and in each of the sections there is arranged a grid 2 that provides the several compartments for the ice cubes.

In the showing of the drawings the upper edges of the tray are rolled, as at 3, to provide the same with beads, and fixed in certain of these beads and projecting beyond the section carrying the same there are rods 4. These rods are designed to be received in the beads of the cooperating tray sections, and by this simple arrangement it will be seen that the tray sections may be connected to present a unitary structure and also that the said sections may be easily and quickly separated one from the other.

The grids 2 are removably received in each of the tray sections and it is to be understood that the drawings illustrate merely one satisfactory embodiment of my invention as I do not wish to be limited to the precise manner in which the tray sections are separably connected nor to the arrangement of such connecting means at the edges of the tray. The principal idea of the tray is "the sectional feature". The number of the sections, method of joining or connecting, material used in construction, whether metal, rubber, composition wood or any other material are all common in the patent as well as the sizes of tray. The patent is intended to cover any size, shape or arrangement of a sectional tray, etc.

Having described the invention, I claim:

A tray of the class described having grids therein providing ice cube compartments, said tray being made up of a number of sections having their ends confronting and having their edges rounded to provide the same with beads and rods fixed in certain of the beads, projecting therefrom and received in the beads of the cooperating tray sections.

In testimony whereof I affix my signature.

HENRY B. TURNER.